United States Patent Office 3,576,614
Patented Apr. 27, 1971

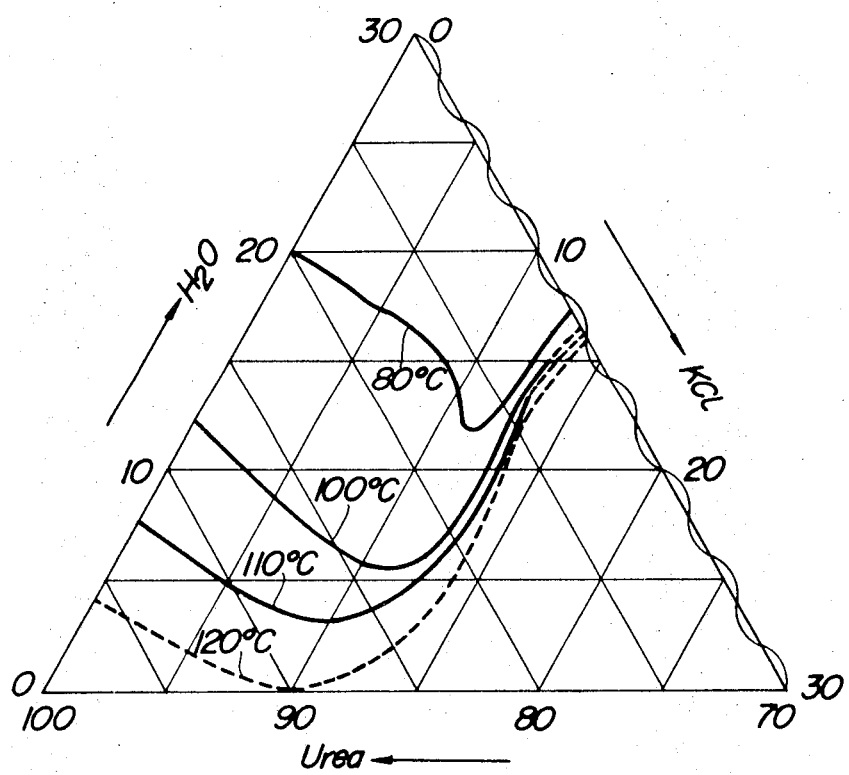

3,576,614
PROCESS FOR PRODUCTION OF GRANULAR HIGH-ANALYSIS COMPOUND FERTILIZER
Kozo Fukuba, Masanori Kobayashi, Akio Sakaue, Hiroshi Nonaka, and Hiroshi Iida, Niihama-shi, and Syozo Fujioka, Ehime-ken, Japan, assignors to Sumitomo Chemical Company, Ltd., Osaka, Japan
Filed Feb. 6, 1968, Ser. No. 703,319
Claims priority, application Japan, Feb. 9, 1967, 42/8,465
Int. Cl. C05b 17/00
U.S. Cl. 71—29                                    4 Claims

ABSTRACT OF THE DISCLOSURE

A granular high analysis compound fertilizer is produced economically and in good efficiency by a process consisting of the following steps:

(1) spraying in the granulating system a melted mixture consisting of 55–95% by weight of urea, 2–44% by weight of potassium chloride and 1–10% by weight of water, into solid raw fertilizer materials consisting of (a) ammonium phosphate and/or superphosphate of lime, (b) other fertilizer components and (c) recycled powdery granules obtained at the step (4), while rotating the granulating system, (2) adding recycled powdery granules obtained at the step (4) to the granulated product obtained at the step (1), (3) cooling the resultant granular mixture obtained at the step (2) in a cooling zone of rotary drum type, (4) sifting the cooled granular mixture obtained at the step (3) to separate a granulated end product from powdery granules, and (5) recycling the powdery granules separated at the step (4) for the granulating treatment at the step (1) and for mixing with the granulated product at the step (2).

---

This invention relates to a process for producing a granular high analysis compound fertilizer consisting of nitrogen, phosphorus and potassium, which are the prime factors of fertilizer. More particularly, the invention relates to a process for producing a granular high analysis compound fertilizer by using a melted mixture of three component system of urea-potassium chloride-water and solid raw fertilizer material consisting of (a) ammonium phosphate and/or superphosphate of lime, (b) other fertilizer components and recycled powdery granules obtained by separating by sifting from end product, under a relatively high temperature in the presence of sensible and fusion heats of said melted mixture.

As methods for producing a granular compound fertilizer, there have been heretofore proposed various processes. They include, for instance, such a so-called wet kneading process which comprises incorporating and kneading a part or whole of starting fertilizer materials in the form of slurry with a product to be recyclically used, and subjecting the resultant mixture to granulating treatment in the presence of appropriate amount of water while rotating, a so-called neutralization process which comprises feeding a slurry-like product obtained by reacting ammonia with phosphoric acid and/or sulfuric acid, solid fertilizer component, recycled product and phosphoric acid and/or sulfuric acid and ammonia to a granulating system and effecting an ammoniation reaction of the resultant mixture while rotating, and processes consisting of partially modified steps of the above-mentioned processes.

The granulated products obtained according to such processes are, then, treated usually with a rotary cylindrical drying apparatus and/or cooling apparatus, and thereafter are subjected to sifting to obtain the desired granulated products and simultaneously the remained powdery granules are returned to the granulating system for the reuse thereof.

When the wet-kneading process is carried out on an industrial scale, however, not only an apparatus of large scale for drying treatment of the granulated product, but also other accessory equipments of large scale are necessary because the granulating temperature employed therefor is generally low and therefore water contents present therein is relatively high and an amount of the recycled product becomes large. In particular, in the case where such substances having high solubilities at a high temperature as urea or ammonium nitrate are contained in relatively large amount in the starting fertilizer materials, a part of salts of these fertilizers is converted to a muddy state during the drying step, whereby an amount of the salts of fertilizers adhered to the internal wall of the drying apparaus is increased. In some cases, the drying operation becomes difficult to be carried out due to decompositions of urea, ammonium nitrate and diammonium hydrogen phosphate.

In the so-called neutralization process a part of water brought into the granulating system is evaporated by heat generated by the ammoniation reaction, and the granulated product having good properties can be obtained. However, an equipment for recovering unreacted ammonia becomes necessary, because absorption efficiency of ammonia is poor during the granulating treatment carried out at a relatively high temperature. In addition thereto, it is impossible to prepare granules of low moisture content, for example, granules having moisture content of less than 1% by weight, and a drying equipment is necessary. Further, various hindrances are encountered similarly as in the case of the wet kneading process. Particularly, in the neutralization process, a local over-heating phenomenon is apt to occur between the solids in the granulating system, because a reaction of ammonia with phosphoric acid and/or sulfuric acid proceeds very quickly, and the phenomenon may result in a poor shape of the produced granules. Furthermore, in some cases, pipes for spraying ammonia to be blown into the granulating system are blocked and the operation efficiency is lowered due to adhesions of salts of fertilizers and the like thereto.

On the other hand, there has also been known a melt-granulating process which comprises heating a mixture consisting of urea, ammonium phosphate and potassium chloride to obtain a fluid melted mixture, spraying or flowing down said fluid melted mixture and subjecting the same to cooling treatment to subsequently obtain the product. According to this process, however, foaming phenomenon vigorously takes place in the melting system, whereby urea is decomposed to produce frequently biuret which is detrimental to fertilization effect. Furthermore, the thus melted mixture is not a perfectly melted liquid but a slurry-like product, and therefore this process has such difficulties that a blockage of spraying- or flowing-pipe is apt to occur when the melted mixture is sprayed or flown down, and that the operation efficiency is poor, and so on.

The present inventors made various studies to produce granular high analysis compound fertilizer having good properties according to an economically advantageous method.

As the result, the present inventors have found that a granulating treatment for producing a granular high analysis compound fertilizer is easily carried out by spraying in a granulating system a melted mixture consisting of 55–95% by weight of urea, 2–44% by weight of potassium chloride and 1–10% by weight of water into solid raw fertilizer materials containing ammonium phosphate or superphosphate of lime or a mixture thereof, recycled powdery granules obtained by separating by sifting from the granular end product and so on, while rotating the granulating system, and that if the granulated product thus obtained is cooled in the presence of recycled powdery granules obtained by separating by sifting from the granular end product, a granular high analysis compound fertilizer having good properties can be obtained.

The one object of the present invention is to propose a process for producing a granular high analysis compound fertilizer having good properties according to an economically advantageous method.

Another object of the present invention is to propose a process for producing a granular high analysis compound fertilizer, which is high in the productive efficiency of end product.

Other objects will be apparent from the following description.

In order to accomplish these objects, the present invention provides a process for producing a granular high analysis compound fertilizer which comprises spraying in a granulating system a melted mixture consisting of 55–95% by weight of urea, 2–44% by weight of potassium chloride and 1–10% by weight of water into solid raw fertilizer materials consisting of (a) ammonium phosphate or superphosphate of lime or a mixture thereof, (b) at least one fertilizer component selected from the group consisting of urea, ammonium nitrate, ammonium sulfate, ammonium chloride and potassium salts and (c) recycled powdery granules obtained by separating by sifting from a granulated end product, while rotating the granulating system.

Further the present invention provides a process for producing a granular high analysis compound fertilizer which comprises adding a part of recycled powdery granules obtained by separating by sifting from the granular end product into the granulated product obtained by the above-mentioned process and cooling the resultant mixture.

By the experiments conducted by the present inventors, it was shown that an eutectic temperature of three-component system consisting of urea, potassium chloride and water in a limited range of the constitution thereof is lower than that of two-component system consisting of urea and potassium chloride. For instance, when about 3% by weight of water is added to the mixture of urea and potassium chloride in which a proportion of potassium chloride is about 12% by weight, the eutectic temperature is lowered by about 10° C., compared with the case of urea-potassium chloride system. According to the experiments conducted by the present inventors, it has been confirmed that the relationship as shown in the figure exists among the individual compound ratios in the three-component system of urea-potassium chloride-water and eutectic temperatures.

In the process of the present invention, in order to obtain a melted mixture of the three-component system of urea-potassium chloride-water at such temperature as below 120° C. where the urea does not decompose, the proportions of urea, potassium chloride and water to be contained therein are selected in the ranges of 55–95% by weight, 2–44% by weight and 1–10% by weight, respectively. When the proportion of potassium chloride contained therein is less than the above range, the eutectic effect becomes poor. On the other hand, if it exceeds said range, because of an increase of solid portion in the mixture, not only transportation of the melted mixture is apt to cause trouble but also various difficulties are encountered in spraying the same into the granulating system.

Furthermore, when the proportion of water is less than 1% by weight, the eutectic temperature becomes high, whereby an amount of biuret produced is increased due to decomposition of urea. On the other hand, if it is above 10% by weight, a drying equipment for the granulated product becomes necessary, because an amount of water to be brought into the granulating system increases. In particular, from the fact that the eutectic point of urea-potassium chloride-water system is maintained at the lowest point when a weight ratio of urea to potassium chloride is 9:1, it is most effective to obtain a melted mixture of the system at the above ratio or thereabouts.

As urea used in the process of the present invention, urea may be used in a form of powders, granules, crystals or aqueous solution containing less than 10% by weight of water.

The melted mixture thus obtained is sprayed under pressure in the granulating system at a temperature of 50° to 110° C. preferably 70°–90° C., into solid raw fertilizer materials consisting of (a) ammonium phosphate and/or superphosphate of lime, (b) at least one fertilizer component selected from the group consisting of urea, ammonium nitrate, ammonium sulfate, ammonium chloride and potassium salts and (c) recycled powdery granules obtained by separating by sifting from a granular end product, in such a manner that said melted mixture may be mixed with said materials as homogeneously as possible and at the same time the resultant mixture is subjected to granulating treatment while rotating the granulating system at a rotation velocity of 10–30 rotations per minute. In this case, the greater parts of urea and potassium chloride in the melted state are crystallized to generate heat due to homogeneously mixing the melted mixture with said powdery granules in the granulating system. Accordingly, temperature of the substances which takes part in the granulating step is elevated by the sensible heat and heat of crystallization of melted liquid, and therefore an effective granulating treatment can be carried out at a relatively high temperature under the adequate moisture and temperature conditions. As a method for accelerating and improving the granulating efficiency, it is also possible to add one or more members selected from the group consisting of bentonite, talc, dolomite, gypsum and diatomaceous earth to the granulating system.

Further, in order to increase anti-caking property of granular end product, diatomaceous earth, kaolin, etc. may be mixed into the granules of end product to effect coating treatment thereof.

Ratio of the amount of the melted mixture to the amount of the solid raw fertilizer materials is 1:1–1:12, preferably 1:4–1:8, by weight.

The adequate relationship between amount of water and temperature in the granulating system varies depending on the proportion of urea, ammonium phosphate and/or superphosphate of lime, and potassium chloride to be contained, and on the kind and amount of other substances which are mixed into the granulating system. When granulating temperature is elevated the granulating operation can be conducted proportionally at a low water content level. In such case, the shape of granules becomes poor, and therefore it is particularly effective to conduct the granulating operation at a level of water content within the range of from about 0.5 to about 2.0% by weight. As ammonium phosphate to be fed into the granulating system, a powdery product having 10–20% by weight of AN (ammonia N) and 40–45% by weight of SP (ammonium-citrate (pH 9.6)-soluble $P_2O_5$) and containing mainly ammonium dihydrogen phosphate and/or diammonium hydrogen phosphate, which can be obtained by ammoniation of wet process, phosphoric acid, is used.

Furthermore, if urea is used in a small amount, the solid raw fertilizer materials may be preheated before feeding said melted mixture to the granulating system, because the sensible heat and heat of crystallization of the melted mixture are too small to be used as a heat source of granulating operation. This preheating treatment is less expensive in cost of equipment, compared with the method which relies on drying treatment of granulated product, and the operational efficiency is very excellent so this preheating treatment is an advantageous method. It is also effective to feed heated gas to the granulating system. When the granulating operation is effected according to such methods as above, local over-heat phenomenon between the solids does not take place, because generation of heat is adequately moderate and the substances which take part in the granulating operation can be homogeneously heated. Therefore the granulating operation can be readily carried out at a relatively high temperature and low water content level, whereby granules having a spherical shape with smooth surface can be obtained.

Thus water content of the product obtained by the process of the present invention is low, for example, being less than 2% by weight, so the product is subjected to cooling treatment without necessitating drying treatment. In the cooling treatment, an apparatus of rotary drum type is effectively used in general. In this case, the granules thus obtained are generally soft immediately after the granulating treatment. Particularly, semi-granulated product before being formed to balls is very soft at the neighbourhood of the granulating temperature, and therefore such product is easily apt to be crushed and damaged by a slightly mechanical impact in the cooling step. For this reason, in the process of the present invention, recycled product of powdery granules obtained by separating by sifting from the granular end product is added and mixed into the granulated product to be introduced into the cooling step. As the result, the granulated product is protected from the mechanical impact action by the recycled powdery granules. At the same time, a coating action of the recycled product onto the semi-granulated product is accompanied with shaping.

Particularly, when the granulated product to be introduced to the cooling step is withdrawn at a relatively high temperature, it becomes possible by well mixing the granulated product with the recycled product to obtain better cooling effect.

After the granulated product is cooled, it is subjected to sifting in order to separate the desired granular high analysis compound fertilizer from the resultant mixture.

In the sifting step the desired amount of the granules of end product having the predetermined grain size are separated from other powdery granules and the separated powdery granules are recycled to the granulating system for reuse and to the cooling system as such or after crushed. Usually, the addition and mixing of the recycled product into the granulated product to be introduced to the cooling step is effected at the time immediately after the completion of granulating treatment or at the cooling step, if necessary. The amount of recycled product is usually effective in particular within the range of about 10 to about 40% by weight based on the total amount of the granulated product. When the amount is above said range, the shape of granules of end product becomes poor, and still more a large scale equipment for recycling becomes necessary. On the other hand, if the amount is less than the above range, this is not suitable for practical use, because the prevention effects of crush and damage of the granules of end product is insufficient.

Further, it has been observed that an amount of fertilizer salts adhered to the internal wall of the cooling apparatus can be remarkably reduced by the addition of the recycled product to the granulated product to be withdrawn from the granulating system.

As stated hereinbefore, when granular compound fertilizer is produced according to the process of the present invention, the greater part of heat of the melted mixture is effectively utilized, whereby the granulating treatment can be effected at a relatively high temperature, and at the same time, a drying equipment for the granulated product is unnecessary, because the amount of water present in the granulating system is very small. Simultaneously, the granulating treatment can be readily carried out with homogenous heating and without causing local over-heating phenomenon among the particles because of moderate generation of heat in the granulating system, whereby the shape of granules having a ball-like form with smooth surface can be obtained.

Further, the granules which are unstable immediately after the granulating treatment are protected from crush and damage by cooling in the presence of the recycled powdery granules. At the same time, the cooling treatment is carried out effectively and desirably from the viewpoint of heat economy under the appropriately moderate conditions. And in addition thereto it becomes possible to reduce remarkably an amount of fertilizer salts adhered to the internal wall of the cooling apparatus. Further, the recycling ratio to the granulating system is lowered, and this becomes advantageous from point of view of heat economy. The operational efficiency of the whole processes of the present invention is particularly high. As is apparent from these facts, granular high analysis compound fertilizer can particularly be produced with economical advantages by the process of the present invention.

The following examples are given to illustrate more concretely the present invention but not a limit the invention. All percentages in the examples are by weight unless otherwise specified.

EXAMPLE 1

320 parts of urea (UN 46%), 35 parts of potassium chloride ($K_2O$ 61%) and 15 parts of water were mixed together and heated to 110° C. to obtain a fluid and homogeneous mixed melt liquid. The mixed melt liquid was sprayed under pressure into a granulating apparatus of rotary drum type, simultaneously 365 parts of powdery ammonium phosphate (AN 12%, SP 52%), 280 parts of potassium chloride ($K_2O$ 61%) and 2700 parts of recycled product were fed thereinto, and granulating treatment was carried out while rotating. At an outlet of the granulating apparatus, temperature was 73° C. and water content of the product was 1.5% by weight. The granulated product was subsequently introduced into a rotary cooler and subjected to cooling treatment with air at a room temperature, then it was sifted to obtain 1040 parts of granular product of 5–12 mesh. The product had a sperical shape with smooth surface. The composition thereof was found to be as follows:

| | Percent |
|---|---|
| $H_2O$ | 1.2 |
| TN (total N) | 19.5 |
| UN (urea N) | 14.9 |
| AN (ammonia N) | 4.6 |
| SP (ammonium-citrate (PH 9.6)-soluble $P_2O_5$) | 19.1 |
| $K_2O$ | 18.5 |

Hardness of the product was 2.5 kg./granule. Furthermore, the amount of fertilizer adhere dto the internal wall of a rotary drying apparatus was found to be 0.7 kg./m.²h.

EXAMPLE 2

320 parts of urea (UN 46%), 15 parts of potassium chloride ($K_2O$ 61%) and 12 parts of water were mixed together and heated to obtain a melted fluid and homogeneous mixture at 115° C.

The melted mixture was sprayed under pressure into an granulating apparatus of rotary drum type, simultaneously 365 parts of powdery ammonium phosphate (AN 12%, SP 52%), 300 parts of potassium chloride ($K_2O$ 61%) and 2600 parts of recycled product were fed thereinto, and granulating treatment was effected while rotating. Temperature and water content of the product at an outle of the granulating apparatus were found to be 74° C. and 1.4%, respectively. The granulated product was subsequently introduced into a rotary cooler and subjected to cooling treatment with air at a room temperature. The resultant product was sifted to obtain 970 parts of granular product of 5–12 mesh. The product had a spherical shape with smooth surface. The composition thereof was found to be as follows.

| | Percent |
|---|---|
| $H_2O$ | 1.1 |
| TN | 19.2 |
| UN | 14.8 |
| AN | 4.4 |
| SP | 18.7 |
| $K_2O$ | 18.9 |

Hardness of the product was 2.5 kg./granule. Furthermore, the amount of fertilizer adhered to the internal wall of a rotary drying apparatus was found to be 0.7 kg./m.$^2$h.

EXAMPLE 3

320 parts of urea (UN 46%), 200 parts of potassium chloride ($K_2O$ 61%) and 25 parts of water were mixed together and heated to obtain a melted mixture at 120° C. The melted mixture was sprayed under pressure into a granulating apparatus of rotary drum type, simultaneously 365 parts of powdery ammonium phosphate (AN 12%, SP 52%), 115 parts of potassium chloride ($K_2O$ 61%) and 2800 parts of recycled product were fed thereinto, and granulating treatment was effected while rotating. Temperature and water content of the product at an outlet of the granulating apparatus were found to be 76° C. and 1.3%, respectively. The granulated product was subsequently introduced into a rotary cooler and subjected to cooling treatment with air at room temperature. The resultant product was then sifted to obtain 1000 parts of granular product of 5–12 mesh.

The product had a sperical shape with smooth surface, and the composition thereof was found to be as follows:

| | Percent |
|---|---|
| $H_2O$ | 1.0 |
| TN | 19.4 |
| UN | 14.5 |
| AN | 4.9 |
| SP | 18.7 |
| $K_2O$ | 18.6 |

Hardness of the product was 2.8 Kg./granule. Furthermore, the amount of fertilizer adhered to the internal wall of a drying apparatus was found to be 0.8 kg./m.$^2$h.

EXAMPLE 4

370 parts of a melted mixture having the same composition as in Example 1 was sprayed into a granulating apparatus of rotary drum type, simultaneously 365 parts of powdery ammonium phosphate (AN 11.8%, SP 53.5%), 280 parts of potassium chloride ($K_2O$ 61%) and 2000 parts of recycled product were fed thereinto, and granulating treatment was effected while rotating to obtain 3000 parts of granulated product. Temperature and water content of the product at an outlet of the granulating apparatus were found to be 77° C. and 1.2%, respectively. Grain distribution thereof was as follows:

| | Percent |
|---|---|
| Particles of larger than 5 mesh | 8.4 |
| Particles between 5 and 12 mesh | 35.2 |
| Particles of smaller than 12 mesh | 56.4 |

Subsequently, into the product, 500 parts of recycled product after having obtained the granules of end product was added and mixed, the mixture was then introduced into a rotary cooler, and was subjected to cooling treatment with air at a room temperature to obtain granular product, of which the grain distribution was found to be as follows:

| | Percent |
|---|---|
| Particles of larger than 5 mesh | 6.7 |
| Particles between 5 and 12 mesh | 29.1 |
| Particles of smaller than 12 mesh | 64.2 |

The resultant product was subsequently sifted with the two stage screen of 5 mesh and 12 mesh to obtain 1000 parts of granules of end products having the grain size between 5 mesh and 12 mesh. The granular product had a spherical shape with smooth surface, and the composition thereof was found to be as follows:

| | Percent |
|---|---|
| $H_2O$ | 0.9 |
| TN | 18.9 |
| UN | 14.3 |
| AN | 4.6 |
| SP | 18.9 |
| $K_2O$ | 18.4 |

Hardness of the product was 2.3 kg./granule. Furthermore, the amount of fertilizer adhered to internal wall of a rotary drying apparatus was found to be 0.3 kg./m.$^2$h.

Further, when the similar granulating and cooling treatments as above were repeated except that the divisional mixing of the recycled product into the product after the granulating treatment, the yield of granules of end product (5–12 mesh) was found to be 720 parts. Furthermore, in this case the amount of fertilizer adhered to the internal wall of the rotary drying apparatus was found to be 0.8 kg./m.$^2$h.

EXAMPLE 5

320 parts of urea (UN 46%), 65 parts of potassium chloride ($K_2O$ 61%) and 18 parts of water were mixed together and heated to obtain a melted mixture at 115° C. The melted mixture was sprayed under pressure into a granulating apparatus of rotary drum type, simultaneously 365 parts of powdery ammonium phosphate (AN 11.8%, SP 53.5%), 250 parts of potassium chloride ($K_2O$ 61%), 20 parts of bentonite, 80 parts of gypsum and 1800 parts of recycled product were fed thereinto, and granulating treatment was effected while rotating to obtain 2940 parts of granulated product. Temperature and water content of the product at an outlet of the granulating apparatus was found to be 79° C. and 1.1%, respectively. Grain distribution thereof was as follows:

| | Percent |
|---|---|
| Particle of larger than 5 mesh | 9.4 |
| Particles between 5 and 12 mesh | 40.2 |
| Particles of smaller than 12 mesh | 50.4 |

Subsequently, into the product, was mixed 500 parts of recycled product after having obtained the granules of end product, the resultant mixture was then introduced into a rotary cooler, and cooling treatment was effected by air fed thereinto at a room temperature to obtain granular product having the following grain distribution:

| | Percent |
|---|---|
| Particles of larger than 5 mesh | 7.2 |
| Particles between 5 and 12 mesh | 32.4 |
| Particles of smaller than 12 mesh | 60.4 |

The resultant product was then sifted to obtain 1100 parts of granular product of 5–12 mesh. The product had a spherical shape with smooth surface, and the composition thereof was found to be as follows:

| | Percent |
|---|---|
| $H_2O$ | 0.9 |
| TN | 17.8 |
| UN | 13.8 |
| AV | 4.0 |
| SP | 17.3 |
| $K_2O$ | 17.5 |

Hardness of the product was 2.5 kg./granule. Furthermore, the amount of fertilizer adhered to the internal wall of a rotary drying apparatus was found to be 0.2 kg./m.$^2$h.

Further, when the similar granulating and cooling treatments as above were repeated except that the divisional addition of the recycled product into the product after the granulating treatment was not effected, the yield of granules of end products (5–12 mesh) was found to be 770 parts. Furthermore, the amount of fertilizer adhered to the internal wall of a rotary drying apparatus was found to be 0.6 kg./m.²h.

What we claim is:

1. A process for producing a granular high analysis compound fertilizer which comprises spraying in a granulating system a melted mixture consisting of 55–95% by weight of urea, 2–44% by weight of potassium chloride and 1–10% by weight of water, into solid raw fertilizer materials consisting of (a) ammonium phosphate, superphosphate of lime or a mixture thereof, (b) at least one fertilizer component selected from the group consisting of urea, ammonium nitrate, ammonium sulfate, ammonium chloride and potassium salts, and (c) recycled powdery granules obtained by separating by sifting from a granulated end product, while rotating the granulating system.

2. A process according to claim 1, wherein the temperature of the granulating system is within the range between 50° and 110° C.

3. A process according to claim 1, wherein ratio of the amount of the melted mixture consisting of 55–95% by weight of urea, 2–44% by weight of potassium chloride and 1–10% by weight of water to the amount of the solid raw fertilizer materials is 1:1–1:12 by weight.

4. A process for producing a granular high analysis compound fertilizer which comprises the following steps:

(1) spraying in the granular system a melted mixture consisting of 55–95% by weight of urea, 2–44% by weight of potassium chloride and 1–10% by weight of water into solid raw fertilizer materials consisting of (a) ammonium phosphate or superphosphate of lime or a mixture thereof, (b) at least one fertilizer component selected from the group consisting of urea, ammonium nitrate, ammonium sulfate, ammonium chloride and potassium salts and (c) recycled powdery granules obtained at the step (4), while rotating the granulating system, (2) adding recycled powdery granules obtained at the step (4) to the granulated product obtained at the step (1), (3) cooling the resultant granular mixture obtained at the step (2) in a cooling zone of rotary drum type, (4) sifting the cooled granular mixture obtained at the step (3) to separate a granulated end product from powdery granules, and (5) recycling the powdery granules separated at the step (4) for the granulating treatment at the step (1) and for mixing with the granulated product at the step (2).

References Cited

UNITED STATES PATENTS

| 2,893,858 | 7/1959 | MacDonald et al. | 71—64 |
| 2,979,421 | 4/1961 | Rissman et al. | 71—64 |
| 3,186,825 | 6/1965 | Price | 71—29 |
| 3,369,885 | 2/1968 | Takahashi et al. | 71—29 |

OTHER REFERENCES

Belgian Patent Report No. 74B, "Fertilizer Composition" p. C17 (copy in class 71, subclass 29).

REUBEN FRIEDMAN, Primary Examiner

C. N. HART, Assistant Examiner

U.S. Cl. X.R.

71—35, 64